(12) United States Patent
Clarke et al.

(10) Patent No.: US 10,192,540 B2
(45) Date of Patent: Jan. 29, 2019

(54) COORDINATED ROUTE DISTRIBUTION SYSTEMS AND METHODS

(71) Applicant: FLIR Belgium BVBA, Meer (BE)

(72) Inventors: Samuel B. Clarke, Sydney (AU);
Thomas A. Green, Newport (AU);
Steve Crane, Fareham (GB)

(73) Assignee: FLIR BELGIUM BVBA, Meer (BE)

( * ) Notice: Subject to any disclaimer, the term of this patent is extended or adjusted under 35 U.S.C. 154(b) by 0 days.

(21) Appl. No.: 14/983,404

(22) Filed: Dec. 29, 2015

(65) Prior Publication Data

US 2016/0187140 A1 Jun. 30, 2016

Related U.S. Application Data

(60) Provisional application No. 62/099,059, filed on Dec. 31, 2014.

(51) Int. Cl.
G05D 1/02 (2006.01)
G08G 3/00 (2006.01)
(Continued)

(52) U.S. Cl.
CPC .......... *G10K 11/26* (2013.01); *G01S 13/9307* (2013.01); *G05D 1/0027* (2013.01); *G05D 1/0088* (2013.01); *G05D 1/0206* (2013.01); *G08G 3/02* (2013.01); *H04L 63/083* (2013.01); *G01S 13/86* (2013.01); *G01S 13/862* (2013.01);
(Continued)

(58) Field of Classification Search
CPC ............................... G05D 1/0206; G08G 3/00
See application file for complete search history.

(56) References Cited

U.S. PATENT DOCUMENTS 7,047,114 B1 * 5/2006 Rogers ..................... G08G 3/02
340/438
8,155,811 B2 * 4/2012 Noffsinger .............. B61L 3/006
701/21
(Continued)

OTHER PUBLICATIONS

Mosterman et al., "Automating Humanitarian Missions with a Heterogeneous Fleet of Vehicles", Annual Reviews in Control, vol. 38, No. 2, Oct. 2014, pp. 259-270.*

*Primary Examiner* — Todd M Melton
(74) *Attorney, Agent, or Firm* — Haynes and Boone, LLP

(57) ABSTRACT

Techniques are disclosed for systems and methods to provide coordinated route distribution for one or more mobile structures. A coordinated route distribution system includes a route generator and/or distribution server and various route retrievers, each of which are used in conjunction with operation of corresponding coordinated mobile structures to retrieve routes from the route generator and/or distribution server. The route retriever includes and/or is configured to communicate with a logic device, a memory, one or more sensors, one or more actuators/controllers, and modules to interface with users, sensors, actuators, and/or other modules of a mobile structure. The logic device is adapted to receive the routes and/or directional data corresponding to the mobile structure and adjust a directional control signal provided to an actuator of the mobile structure accordingly. Portions of the routes and/or control signals are displayed or used to adjust steering actuators, propulsion system thrusts, and/or other operational systems.

20 Claims, 4 Drawing Sheets

(51) Int. Cl.
*G05D 1/00* (2006.01)
*G10K 11/26* (2006.01)
*H04L 29/06* (2006.01)
*G01S 13/93* (2006.01)
*G08G 3/02* (2006.01)
*G01S 15/02* (2006.01)
*G01S 13/86* (2006.01)
*G01S 15/88* (2006.01)

(52) U.S. Cl.
CPC .......... *G01S 13/867* (2013.01); *G01S 15/025* (2013.01); *G01S 15/88* (2013.01)

(56) References Cited

U.S. PATENT DOCUMENTS

| | | | | |
|---|---|---|---|---|
| 9,529,357 | B1* | 12/2016 | Eggers | G05D 1/0027 |
| 2011/0202591 | A1* | 8/2011 | Reis | G06Q 10/08 |
| | | | | 709/203 |
| 2011/0288695 | A1* | 11/2011 | Gariepy | G05D 1/0027 |
| | | | | 701/2 |
| 2015/0066240 | A1* | 3/2015 | Das Adhikary | G01C 21/12 |
| | | | | 701/1 |
| 2015/0278734 | A1* | 10/2015 | Grant | G06Q 10/06 |
| | | | | 705/7.23 |

\* cited by examiner

COORDINATED ROUTE DISTRIBUTION SYSTEMS AND METHODS

CROSS-REFERENCE TO RELATED APPLICATIONS

This application claims priority to and the benefit of U.S. Provisional Patent Application No. 62/099,059 filed Dec. 31, 2014 and entitled "COORDINATED ROUTE DISTRIBUTION SYSTEMS AND METHODS", which is hereby incorporated herein by reference in its entirety.

This application is related to International Patent Application No. PCT/US2015/015279 filed Feb. 10, 2015 and entitled "MODULAR SONAR TRANSDUCER ASSEMBLY SYSTEMS AND METHODS" and claims priority to and the benefit of U.S. Provisional Patent Application No. 61/943,170 filed Feb. 21, 2014 and entitled "MODULAR SONAR TRANSDUCER ASSEMBLY SYSTEMS AND METHODS", all of which are hereby incorporated herein by reference in their entirety.

This application is also related to International Patent Application No. PCT/US2015/032304 filed May 22, 2015 and entitled "MULTICHANNEL SONAR SYSTEMS AND METHODS" and claims priority to and the benefit of U.S. Provisional Patent Application No. 62/005,838 filed May 30, 2014 and entitled "MULTICHANNEL SONAR SYSTEMS AND METHODS", all of which are hereby incorporated herein by reference in their entirety.

This application is also related to International Patent Application No. PCT/US2015/015281 filed Feb. 10, 2015 and entitled "ACCELERATION CORRECTED ATTITUDE ESTIMATION SYSTEMS AND METHODS" and claims priority to and the benefit of U.S. Provisional Patent Application No. 61/942,517 filed Feb. 20, 2014 and entitled "ACCELERATION CORRECTED ATTITUDE ESTIMATION SYSTEMS AND METHODS", all of which are hereby incorporated herein by reference in their entirety.

This application is also related to U.S. Provisional Patent Application No. 62/099,016 filed Dec. 31, 2014 and entitled "ADAPTIVE TRACK KEEPING SYSTEMS AND METHODS", which is hereby incorporated herein by reference in its entirety.

This application is also related to U.S. Provisional Patent Application No. 62/099,032 filed Dec. 31, 2014 and entitled "PROACTIVE DIRECTIONAL CONTROL SYSTEMS AND METHODS", which is hereby incorporated herein by reference in its entirety.

This application is also related to U.S. Provisional Patent Application No. 62/099,022 filed Dec. 31, 2014 and entitled "STABILIZED DIRECTIONAL CONTROL SYSTEMS AND METHODS", which is hereby incorporated herein by reference in its entirety.

TECHNICAL FIELD

One or more embodiments of the invention relate generally to route distribution and more particularly, for example, to systems and methods for coordinated route distribution to vehicles.

BACKGROUND

Organizing movement of large groups of vehicles can be an extremely complex endeavor, particularly if the vehicles include a variety of types of mobile structures, such as planes, watercraft, and automobiles. Conventionally, such organization relies heavily on human interactions to relay instructions and deviations from a central organizational scheme, and such process is prone to error and can inherently limit the amount and timeliness of the information conveyed.

In particular, crisis response typically involves marshaling a number of different but available resources and attempting to use them effectively to resolve the crisis in as short a time as possible. Accuracy and timeliness are important concerns, and anything that can streamline deployment can convert an otherwise ineffective team effort into a successful crisis response. Thus, there is a need for flexible coordinated routing distribution methodologies, particularly in the context of coordinating search and rescue efforts across a variety of different types of professional and volunteer mobile structures (aircraft, watercraft, automobiles, unmanned vehicles, and/or other mobile structures) committed to an emergent crisis response.

SUMMARY

Techniques are disclosed for systems and methods to provide coordinated route distribution for one or more mobile structures. In accordance with one or more embodiments, a coordinated route distribution system may include a route generator and/or distribution server and various route retrievers, each of which may be used in conjunction with operation of one or more coordinated mobile structures to retrieve routes from the route generator and/or distribution server. The route retriever may include and/or be configured to communicate with a logic device, a memory, one or more sensors, one or more actuators/controllers, and modules to interface with users, sensors, actuators, and/or other modules of a mobile structure. The logic device may be adapted to receive the routes and/or directional data corresponding to the mobile structure and adjust a directional control signal provided to an actuator of the mobile structure accordingly. Various portions of the routes and/or various types of control signals may be displayed to a user and/or used to adjust a steering actuator, a propulsion system thrust, and/or other operational systems of the mobile structure.

In various embodiments, a coordinated route distribution system may include a logic device configured to communicate with a user interface and/or a controller for a mobile structure. The logic device may be configured to retrieve route data for the mobile structure from a route distribution server over a network and provide the route data to the user interface and/or the controller for the mobile structure. In some embodiments, the logic device may be configured to access the route distribution server by identifying the mobile structure to the route distribution server or by authenticating the mobile structure to the route distribution server prior to retrieving the route data.

In some embodiments, a method may include retrieving route data for a mobile structure from a route distribution server over a network and providing the route data to a user interface and/or a controller for the mobile structure. In some embodiments, the method may include determining the route data for the mobile structure is a complete route and indicating successful retrieval of the route data by providing one or more email messages, text messages, data files, and/or data streams to the route distribution server.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

In accordance with various embodiments of the present disclosure, systems and methods may provide coordinated routing of mobile structures that is substantially more reliable and accurate than conventional systems across a wide variety of types of structures. For example, conventional search and rescue operations involve individual and separate verbal transmissions of search pattern coordinates to individual watercraft, and each user of a watercraft must manually note the coordinates. Updates often require additional verbal transmissions or temporary physical co-location of the user and the coordinator, and there is no central mechanism for one watercraft to have knowledge about other watercraft and/or aircraft involved in the crisis response.

One or more embodiments of the described coordinated route distribution system may advantageously include a route retriever, a controller, and one or more of an orientation sensor, a gyroscope, an accelerometer, a position sensor, a speed sensor, and/or a steering sensor/actuator providing measurements of an orientation, position, acceleration, speed, and/or steering angle of the mobile structure. In some embodiments, the route retriever may be adapted to execute one or more control loops configured to retrieve route data from a route distribution server using the route retriever and provide the route data to one or more modules of a mobile structure, such as a user interface and/or the controller, as described herein. For example, the route retriever and sensors may be mounted to or within the mobile structure (e.g., a watercraft, aircraft, motor vehicle, and/or other mobile structure), or may be integrated with the controller. Various embodiments of the present disclosure may be configured to automatically coordinate steering actuator operations with route data provided by the route retriever to provide accurate directional control of a mobile structure that is coordinated with one or more other mobile structures.

Figure 1A:
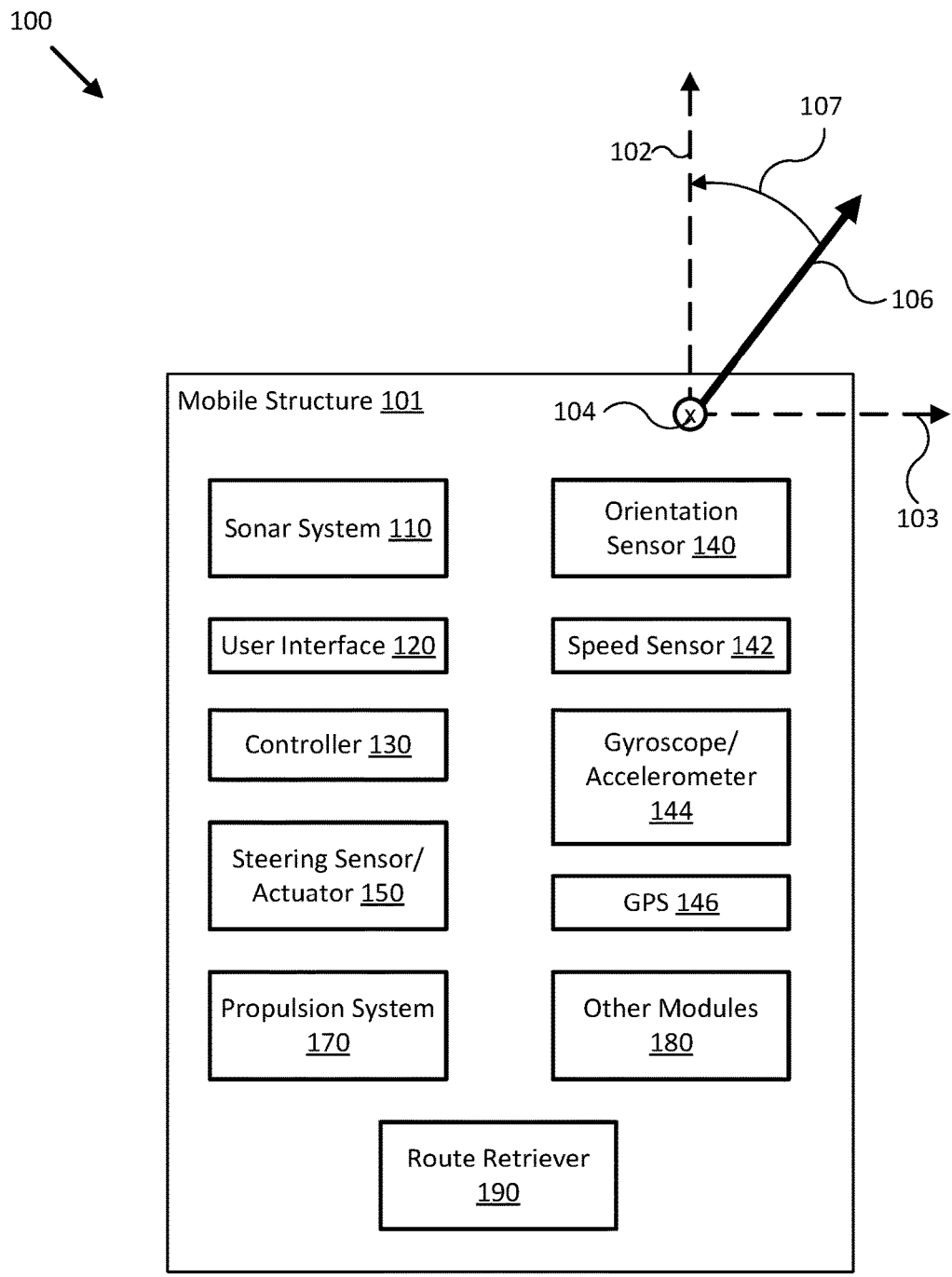
FIG. 1A illustrates a block diagram of a mobile structure including a portion of a route distribution system in accordance with an embodiment of the disclosure.

As an example, FIG. 1A illustrates a block diagram of system 100 in accordance with an embodiment of the disclosure. In various embodiments, system 100 may be adapted to provide coordinated route distribution and/or corresponding directional control for a particular mobile structure 101. Directional control of a mobile structure may refer to control of any one or combination of yaw, pitch, or roll of mobile structure 101. In some embodiments, system 100 may be adapted to measure an orientation, a position, an acceleration, and/or a speed of mobile structure 101. System 100 may then use these measurements to control operation of mobile structure 101, such as controlling steering actuator 150 and/or propulsion system 170 to steer mobile structure 101 according to a heading along a retrieved route, such as heading angle 107, for example.

In the embodiment shown in FIG. 1A, system 100 may be implemented to provide coordinated route distribution for a particular type of mobile structure 101 with corresponding particular features, such as a drone, a watercraft, an aircraft, a robot, a vehicle, and/or other types of mobile structures. In one embodiment, system 100 may include one or more of a sonar system 110, a user interface 120, a controller 130, an orientation sensor 140, a speed sensor 142, a gyroscope/accelerometer 144, a global positioning satellite system (GPS) 146, a steering sensor/actuator 150, a propulsion system 170, a route retriever 190, and one or more other sensors and/or actuators used to sense and/or control a state of mobile structure 101, such as other modules 180. In some embodiments, one or more of the elements of system 100 may be implemented in a combined housing or structure that can be coupled to mobile structure 101 and/or held or carried by a user of mobile structure 101.

Directions 102, 103, and 104 describe one possible coordinate frame of mobile structure 101 (e.g., for headings or orientations measured by orientation sensor 140 and/or angular velocities and accelerations measured by gyroscope/accelerometer 144). As shown in FIG. 1A, direction 102 illustrates a direction that may be substantially parallel to and/or aligned with a longitudinal axis of mobile structure 101, direction 103 illustrates a direction that may be substantially parallel to and/or aligned with a lateral axis of mobile structure 101, and direction 104 illustrates a direction that may be substantially parallel to and/or aligned with a vertical axis of mobile structure 101, as described herein. For example, a roll component of motion of mobile structure 101 may correspond to rotations around direction 102, a pitch component may correspond to rotations around direction 103, and a yaw component may correspond to rotations around direction 104.

Heading angle 107 may correspond to the angle between a projection of a reference direction 106 (e.g., the local component of the Earth's magnetic field) onto a horizontal plane (e.g., referenced to a gravitationally defined "down" vector local to mobile structure 101) and a projection of direction 102 onto the same horizontal plane. In some embodiments, the projection of reference direction 106 onto a horizontal plane (e.g., referenced to a gravitationally defined "down" vector) may be referred to as Magnetic North. In various embodiments, Magnetic North, a "down" vector, and/or various other directions, positions, and/or fixed or relative reference frames may define an absolute coordinate frame, for example, where directional measurements referenced to an absolute coordinate frame may be referred to as absolute directional measurements (e.g., an "absolute" orientation).

In some embodiments, directional measurements may initially be referenced to a coordinate frame of a particular sensor (e.g., a sonar transducer assembly or module of sonar system 110) and be transformed (e.g., using parameters for one or more coordinate frame transformations) to be referenced to an absolute coordinate frame and/or a coordinate frame of mobile structure 101. In various embodiments, an absolute coordinate frame may be defined and/or correspond to a coordinate frame with one or more undefined axes, such as a horizontal plane local to mobile structure 101 referenced to a local gravitational vector but with an unreferenced and/or undefined yaw reference (e.g., no reference to Magnetic North).

Sonar system 110 may be implemented with one or more electrically and/or mechanically coupled controllers, transmitters, receivers, transceivers, signal processing logic devices, autonomous power systems, various electrical components, transducer elements of various shapes and sizes, multichannel transducers/transducer modules, transducer assemblies, assembly brackets, transom brackets, and/or various actuators adapted to adjust orientations of any of the components of sonar system 110, as described herein. Sonar system 110 may be configured to emit one, multiple, or a series of acoustic beams, receive corresponding acoustic returns, and convert the acoustic returns into sonar data and/or imagery, such as bathymetric data, water depth, water temperature, water column/volume debris, bottom profile, and/or other types of sonar data. Sonar system 110 may be configured to provide such data and/or imagery to user interface 120 for display to a user, for example, or to controller 130 for additional processing, as described herein.

For example, in various embodiments, sonar system 110 may be implemented and/or operated according to any one or combination of the systems and methods described in U.S. Provisional Patent Application 62/005,838 filed May 30, 2014 and entitled "MULTICHANNEL SONAR SYSTEMS AND METHODS", U.S. Provisional Patent Application 61/943,170 filed Feb. 21, 2014 and entitled "MODULAR SONAR TRANSDUCER ASSEMBLY SYSTEMS AND METHODS", and/or U.S. Provisional Patent Application 62/087,189 filed Dec. 3, 2014 and entitled "AUTONOMOUS SONAR SYSTEMS AND METHODS", each of which are hereby incorporated by reference in their entirety. In other embodiments, sonar system 110 may be implemented according to other sonar system arrangements that can be used to detect objects within a water column and/or a floor of a body of water.

User interface 120 may be implemented as one or more of a display, a touch screen, a keyboard, a mouse, a joystick, a knob, a steering wheel, a ship's wheel or helm, a yoke, and/or any other device capable of accepting user input and/or providing feedback to a user. For example, in some embodiments, user interface 120 may be implemented and/or operated according to any one or combination of the systems and methods described in U.S. Provisional Patent Application 62/069,961 filed Oct. 29, 2014 and entitled "PILOT DISPLAY SYSTEMS AND METHODS", which is hereby incorporated by reference in its entirety.

In various embodiments, user interface 120 may be adapted to provide user input (e.g., as a type of signal and/or sensor information) to other devices of system 100, such as controller 130. User interface 120 may also be implemented with one or more logic devices that may be adapted to execute instructions, such as software instructions, implementing any of the various processes and/or methods described herein. For example, user interface 120 may be adapted to form communication links, transmit and/or receive communications (e.g., route data, sensor signals, control signals, sensor information, user input, and/or other information), determine various coordinate frames and/or orientations, determine parameters for one or more coordinate frame transformations, and/or perform coordinate frame transformations, for example, or to perform various other processes and/or methods described herein.

In some embodiments, user interface 120 may be adapted to accept user input, for example, to form a communication link, to select a particular wireless networking protocol and/or parameters for a particular wireless networking protocol and/or wireless link (e.g., a password, an encryption key, a MAC address, a device identification number, a device operation profile, parameters for operation of a device, and/or other parameters), to select a method of processing sensor signals to determine sensor information, to adjust a position and/or orientation of an articulated sensor, and/or to otherwise facilitate operation of system 100 and devices within system 100. Once user interface 120 accepts a user input, the user input may be transmitted to other devices of system 100 over one or more communication links.

In one embodiment, user interface 120 may be adapted to receive a sensor or control signal (e.g., from route retriever 190, orientation sensor 140, and/or steering sensor/actuator 150) over communication links formed by one or more associated logic devices, for example, and display sensor and/or other information corresponding to the received sensor or control signal to a user, such as displaying retrieved route data on a geographical chart. In related embodiments, user interface 120 may be adapted to process sensor and/or control signals to determine sensor and/or other information. For example, a sensor signal may include an orientation, an angular velocity, an acceleration, a speed, and/or a position of mobile structure 101 and/or other elements of system 100. In such embodiment, user interface 120 may be adapted to process the sensor signals to determine sensor information indicating an estimated and/or absolute roll, pitch, and/or yaw (attitude and/or rate), and/or a position or series of positions of mobile structure 101 and/or other elements of system 100, for example, and display the sensor information as feedback to a user.

In one embodiment, user interface 120 may be adapted to display a time series of various sensor information and/or other parameters as part of or overlaid on a graph or map, which may be referenced to a position and/or orientation of mobile structure 101 and/or other element of system 100. For example, user interface 120 may be adapted to display a time series of positions, headings, and/or orientations of mobile structure 101 and/or other elements of system 100 overlaid on a geographical map, which may include one or more graphs indicating a corresponding time series of actuator control signals, sensor information, and/or other sensor and/or control signals.

In some embodiments, user interface 120 may be adapted to accept user input including a user-defined target heading, waypoint, route, and/or orientation for an element of system 100, for example, and to generate control signals for steering sensor/actuator 150 and/or propulsion system 170 to cause mobile structure 101 to move according to the target heading, waypoint, route, and/or orientation. In other embodiments, user interface 120 may be adapted to accept route data including a server-defined target heading, waypoint, route, and/or orientation for an element of system 100, for example, and to generate corresponding control signals for elements of system 100. In various embodiments, user interface 120 may be adapted to accept user input modifying a control loop parameter of controller 130, for example, or selecting a responsiveness of controller 130 in controlling a direction (e.g., through application of a particular steering angle) of mobile structure 101.

For example, a responsiveness setting may include selections of Performance (e.g., fast response), Cruising (medium response), and Economy (slow response) responsiveness, where the different settings are used to choose between a more pronounced and immediate steering response (e.g., a faster control loop response) or reduced steering actuator activity (e.g., a slower control loop response). In some embodiments, a responsiveness setting may correspond to a maximum desired lateral acceleration during a turn. In such embodiments, the responsiveness setting may modify a gain, a deadband, a limit on an output, a bandwidth of a filter, and/or other control loop parameters of controller 130, as described herein.

In further embodiments, user interface 120 may be adapted to accept user input including a user-defined target attitude, orientation, and/or position for an actuated device (e.g., sonar system 110) associated with mobile structure 101, for example, and to generate control signals for adjusting an orientation and/or position of the actuated device according to the target attitude, orientation, and/or position. More generally, user interface 120 may be adapted to display sensor information to a user, for example, and/or to transmit sensor information and/or user input to other user interfaces, sensors, or controllers of system 100, for instance, for display and/or further processing.

Controller 130 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of steering sensor/actuator 150, mobile structure 101, and/or other elements of system 100, for example. Such software instructions may also implement methods for processing sensor signals, determining sensor information, providing user feedback (e.g., through user interface 120), querying devices for operational parameters, selecting operational parameters for devices, or performing any of the various operations described herein (e.g., operations performed by logic devices of various devices of system 100).

In addition, a machine readable medium may be provided for storing non-transitory instructions for loading into and execution by controller 130. In these and other embodiments, controller 130 may be implemented with other components where appropriate, such as volatile memory, non-volatile memory, one or more interfaces, and/or various analog and/or digital components for interfacing with devices of system 100. For example, controller 130 may be adapted to store sensor signals, sensor information, parameters for coordinate frame transformations, calibration parameters, sets of calibration points, and/or other operational parameters, over time, for example, and provide such stored data to a user using user interface 120. In some embodiments, controller 130 may be integrated with one or more user interfaces (e.g., user interface 120) and/or may share a communication module or modules.

As noted herein, controller 130 may be adapted to execute one or more control loops for route retrieval, actuated device control, steering control (e.g., using steering sensor/actuator 150 and/or propulsion system 170) and/or performing other various operations of mobile structure 101 and/or system 100. In some embodiments, a control loop may include processing sensor signals and/or sensor information, such as route data, in order to control one or more operations of mobile structure 101 and/or system 100.

For example, controller 130 may be adapted to receive a measured heading 107 of mobile structure 101 from orientation sensor 140, a measured steering rate (e.g., a measured yaw rate, in some embodiments) from gyroscope/accelerometer 144, a measured speed from speed sensor 142, a measured position or series of absolute and/or relative positions from GPS 146, a measured steering angle from steering sensor/actuator 150, route data from route retriever 190, and/or a user input from user interface 120. In some embodiments, such route data may include a target heading 106, for example, one or more absolute positions and/or waypoints (e.g., from which target heading 106 may be derived), and/or one or more other control loop parameters. In further embodiments, controller 130 may be adapted to determine a steering demand based on one or more of the received sensor signals, including the route data, and provide the steering demand to steering sensor/actuator 150. For example, in various embodiments, controller 130 may be implemented and/or operated to access sensor signals and/or provide directional control according to any one or combination of the systems and methods described in U.S. Provisional Patent Application No. 61/942,517 filed Feb. 20, 2014 and entitled "ACCELERATION CORRECTED ATTITUDE ESTIMATION SYSTEMS AND METHODS", U.S. Provisional Patent Application No. 62/099,016 filed Dec. 31, 2014 and entitled "ADAPTIVE TRACK KEEPING SYSTEMS AND METHODS", U.S. Provisional Patent Application No. 62/099,032 filed Dec. 31, 2014 and entitled "PROACTIVE DIRECTIONAL CONTROL SYSTEMS AND METHODS", and/or U.S. Provisional Patent Application No. 62/099,022 filed Dec. 31, 2014 and entitled "STABILIZED DIRECTIONAL CONTROL SYSTEMS AND METHODS", each of which are hereby incorporated by reference in their entirety.

Orientation sensor 140 may be implemented as one or more of a compass, float, accelerometer, and/or other device capable of measuring an orientation of mobile structure 101 (e.g., magnitude and direction of roll, pitch, and/or yaw, relative to one or more reference orientations such as gravity and/or Magnetic North) and providing such measurements as sensor signals that may be communicated to various devices of system 100. In some embodiments, orientation sensor 140 may be adapted to provide heading measurements for mobile structure 101. In other embodiments, orientation sensor 140 may be adapted to provide a pitch, pitch rate, roll, roll rate, yaw, and/or yaw rate for mobile structure 101 (e.g., using a time series of orientation measurements). In such embodiments, controller 130 may be configured to determine a compensated yaw rate based on the provided sensor signals. In various embodiments, a yaw rate and/or compensated yaw rate may be approximately equal to a steering rate of mobile structure 101. Orientation sensor 140 may be positioned and/or adapted to make orientation measurements in relation to a particular coordinate frame of mobile structure 101, for example.

Speed sensor 142 may be implemented as an electronic pitot tube, metered gear or wheel, water speed sensor, wind speed sensor, a wind velocity sensor (e.g., direction and magnitude) and/or other device capable of measuring or determining a linear speed of mobile structure 101 (e.g., in a surrounding medium and/or aligned with a longitudinal axis of mobile structure 101) and providing such measurements as sensor signals that may be communicated to various devices of system 100. In some embodiments, speed sensor 142 may be adapted to provide a velocity of a surrounding medium relative to sensor 142 and/or mobile structure 101.

Gyroscope/accelerometer 144 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of mobile structure 101 and providing such measurements as sensor signals that may be communicated to other devices of system 100 (e.g., user interface 120, controller 130). In some embodiments, gyroscope/accelerometer 144 may be adapted to determine pitch, pitch rate, roll, roll rate, yaw, yaw rate, compensated yaw rate, an absolute speed, and/or a linear acceleration rate of mobile structure 101. Thus, gyroscope/accelerometer 144 may be adapted to provide a measured heading, a measured steering rate, and/or a measured speed for mobile structure 101. In some embodiments, gyroscope/accelerometer 144 may provide pitch rate, roll rate, yaw rate, and/or a linear acceleration of mobile structure 101 to controller 130 and controller 130 may be adapted to determine a compensated yaw rate based on the provided sensor signals. Gyroscope/accelerometer 144 may be positioned and/or adapted to make such measurements in relation to a particular coordinate frame of mobile structure 101, for example. In various embodiments, gyroscope/accelerometer 144 may be implemented in a common housing and/or module to ensure a common reference frame or a known transformation between reference frames.

GPS 146 may be implemented as a global positioning satellite receiver and/or other device capable of determining an absolute and/or relative position of mobile structure 101 based on wireless signals received from space-born and/or terrestrial sources, for example, and capable of providing such measurements as sensor signals that may be communicated to various devices of system 100.

In some embodiments, GPS 146 may be adapted to determine and/or estimate a velocity, speed, and/or yaw rate of mobile structure 101 (e.g., using a time series of position measurements), such as an absolute velocity and/or a yaw component of an angular velocity of mobile structure 101. In various embodiments, one or more logic devices of system 100 may be adapted to determine a calculated speed of mobile structure 101 and/or a computed yaw component of the angular velocity from such sensor information.

Steering sensor/actuator 150 may be adapted to physically adjust a heading of mobile structure 101 according to one or more control signals, user inputs, and/or stabilized attitude estimates provided by a logic device of system 100, such as controller 130. Steering sensor/actuator 150 may include one or more actuators and control surfaces (e.g., a rudder or other type of steering mechanism) of mobile structure 101, and may be adapted to sense and/or physically adjust the control surfaces to a variety of positive and/or negative steering angles/positions.

In various embodiments, steering sensor/actuator 150 may be implemented as a number of separate sensors and/or actuators, for example, to sense and/or control a one or more steering mechanisms substantially simultaneously, such as one or more rudders, elevators, and/or automobile steering mechanisms, for example. In some embodiments, steering sensor/actuator 150 may include one or more sensors and/or actuators adapted to sense and/or adjust a propulsion force (e.g., a propeller speed and/or an engine rpm) generated by propulsion system 170 of mobile structure 101, for example, to effect a particular directional control maneuver (e.g., to meet a particular steering demand within a particular period of time), for instance, or to provide a safety measure (e.g., an engine cut-off and/or reduction in mobile structure speed).

Propulsion system 170 may be implemented as a propeller, turbine, or other thrust-based propulsion system, a mechanical wheeled and/or tracked propulsion system, a sail-based propulsion system, and/or other types of propulsion systems that can be used to provide motive force to mobile structure 101. In some embodiments, propulsion system 170 may be non-articulated, for example, such that the direction of motive force and/or thrust generated by propulsion system 170 is fixed relative to a coordinate frame of mobile structure 101. Non-limiting examples of non-articulated propulsion systems include, for example, an inboard motor for a watercraft with a fixed thrust vector, for example, or a fixed aircraft propeller or turbine. In other embodiments, propulsion system 170 may be articulated, for example, and/or may be coupled to and/or integrated with steering sensor/actuator 150, such that the direction of generated motive force and/or thrust is variable relative to a coordinate frame of mobile structure 101. Non-limiting examples of articulated propulsion systems include, for example, an outboard motor for a watercraft, an inboard motor for a watercraft with a variable thrust vector/port (e.g., used to steer the watercraft), a sail, or an aircraft propeller or turbine with a variable thrust vector, for example. As such, in some embodiments, propulsion system 170 may be integrated with steering sensor/actuator 150.

Other modules 180 may include other and/or additional sensors, actuators, communications modules/nodes, and/or user interface devices used to provide additional environmental information of mobile structure 101, for example. In some embodiments, other modules 180 may include a humidity sensor, a wind and/or water temperature sensor, a barometer, a radar system, a visible spectrum camera, an infrared camera, and/or other environmental sensors providing measurements and/or other sensor signals that can be displayed to a user and/or used by other devices of system 100 (e.g., controller 130) to provide operational control of mobile structure 101 and/or system 100 that compensates for environmental conditions, such as wind speed and/or direction, swell speed, amplitude, and/or direction, and/or an object in a path of mobile structure 101, for example.

In some embodiments, other modules 180 may include one or more actuated and/or articulated devices (e.g., spotlights, visible and/or IR cameras, radars, sonars, and/or other actuated devices) coupled to mobile structure 101, where each actuated device includes one or more actuators adapted to adjust an orientation of the device, relative to mobile structure 101, in response to one or more control signals (e.g., provided by controller 130). In further embodiments, other modules 180 may include one or more communication modules and/or devices (e.g., antennas, satellite dishes, wired and/or wireless interfaces) allowing devices in system 100 to access one or more wired and/or wireless networks, including the Internet and/or one or more private or proprietary networks.

Route retriever 190 may be implemented as one or more logic devices, similar to controller 130, configured to access and/or retrieve route data from a route distribution server, for example, and provide the route data to user interface 120 and/or controller 130. Such access may include forming one or more communication links over one or more networks, such as a local area network (LAN) (e.g., local to mobile structure 101), a wide area network (WAN) (e.g., the Internet), and/or other types of networks (e.g., a packet radio network, RAYNET), which may be wired, wireless, and/or a combination of wired and wireless infrastructures (e.g., microwave, WiFi, cellular, satellite, and/or other network infrastructure).

In various embodiments, route retriever 190 may be integrated with controller 130, for example, and/or may be implemented, at least in part, as software executed by controller 130. In other embodiments, route retriever 190 may be implemented as a separate programmable logic device, such as a Raspberry Pi, a smart phone, a tablet computer, personal computer, a multifunction display (MFD), and/or other logic device implemented with a communications module and/or modem configured to access a route distribution server. In embodiments where route retriever 190 is implemented as a separate and relatively small, inexpensive, or portable programmable logic device (e.g., a Raspberry Pi, a smart phone, a tablet computer), route retriever 190 may be easily distributed to users and/or quickly integrated into a mobile structure control system to facilitate time critical implementation of coordinated routing distribution, as described herein.

In some embodiments, route retriever 190 may be configured to translate the route data into a series of waypoints (e.g., waypoint information) that can be used by user interface 120 and/or controller 130 to autopilot mobile structure 101 according the series of waypoints. Such waypoints may include geographical positions and/or times or ranges of times of day indicating a time at which one or more waypoints should be reached by mobile structure 101. In other embodiments, user interface 120 may be configured to display the series of waypoints as a contiguous route on a chart to a user.

In further embodiments, the route data may include orientations and/or other control parameters for an actuated device coupled to mobile structure 101. For example, the route data may include a route for mobile structure 101 and a relative or absolute orientation (e.g., relative to mobile structure 101), a sweep rate, a sensor beam width, an acquisition rate, a spectral content, and/or other control parameters for an actuated embodiment of sonar system 110, an actuated spotlight, and/or an actuated visible and/or infrared spectrum camera (e.g., other modules 180) mounted to mobile structure 101. Such route data may include an identifier uniquely identifying mobile structure 101 and/or various elements of system 100, for example, to help coordinate a variety of mobile structures with different features (e.g., different elements of system 100). In still further embodiments, the route data may include software updates and/or format updates allowing route retriever 190 to translate route data into a series of waypoints that can be used by a particular user interface or controller, for example, and/or to translate route data into various control parameters that can be used by a particular user interface or controller.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sonar data and/or imagery, for example, or for transmitting and/or receiving communications, such as sensor signals, sensor information, and/or control signals, between one or more devices of system 100. In one embodiment, such method may include instructions to receive an orientation, acceleration, position, and/or speed of mobile structure 101 from various sensors, to determine a steering error or demand related to the sensor signals, and/or to control steering sensor/actuator 150 and/or other actuators or elements of system 100 to adjust operation of system 100 accordingly, for example, as described herein. In various embodiments, such method may include instructions for forming one or more communication links between various devices of system 100.

In addition, one or more machine readable mediums may be provided for storing non-transitory instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Each of the elements of system 100 may be implemented with one or more amplifiers, modulators, phase adjusters, beamforming components, digital to analog converters (DACs), analog to digital converters (ADCs), various interfaces, antennas, transducers, and/or other analog and/or digital components enabling each of the devices of system 100 to transmit and/or receive signals, for example, in order to facilitate wired and/or wireless communications between one or more devices of system 100. Such components may be integrated with a corresponding element of system 100, for example. In some embodiments, the same or similar components may be used to perform one or more sensor measurements, as described herein.

Sensor signals, control signals, and other signals and/or information may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques.

In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements. For example, gyroscope/accelerometer 144 and controller 130 may be configured to share one or more components, such as a memory, a logic device, a communications module, and/or other components, and such sharing may act to reduce and/or substantially eliminate such timing errors while reducing overall system complexity and/or cost.

Each element of system 100 may include one or more batteries, capacitors, or other electrical power storage devices, for example, and may include one or more solar cell modules or other electrical power generating devices (e.g., a wind or water-powered turbine, or a generator producing electrical power from motion of one or more elements of system 100). In some embodiments, one or more of the devices may be powered by a power source for mobile structure 101, using one or more power leads. Such power leads may also be used to support one or more communication techniques between elements of system 100.

In various embodiments, a logic device of system 100 (e.g., of orientation sensor 140 and/or other elements of system 100) may be adapted to determine parameters (e.g., using signals from various devices of system 100) for transforming a coordinate frame of other elements of system 100 to/from a coordinate frame of mobile structure 101, at-rest and/or in-motion, and/or other coordinate frames, as described herein. One or more logic devices of system 100 may be adapted to use such parameters to transform a coordinate frame of the other elements of system 100 to/from a coordinate frame of orientation sensor 140 and/or mobile structure 101, for example. Furthermore, such parameters may be used to determine and/or calculate one or more adjustments to an orientation of an element of system 100 that would be necessary to physically align a coordinate frame of the element with a coordinate frame of orientation sensor 140 and/or mobile structure 101, for example, or an absolute coordinate frame and/or other desired positions and/or orientations. Adjustments determined from such parameters may be used to selectively power adjustment servos/actuators (e.g., of various elements of system 100), for example, or may be communicated to a user through user interface 120, as described herein.

Figure 1B:
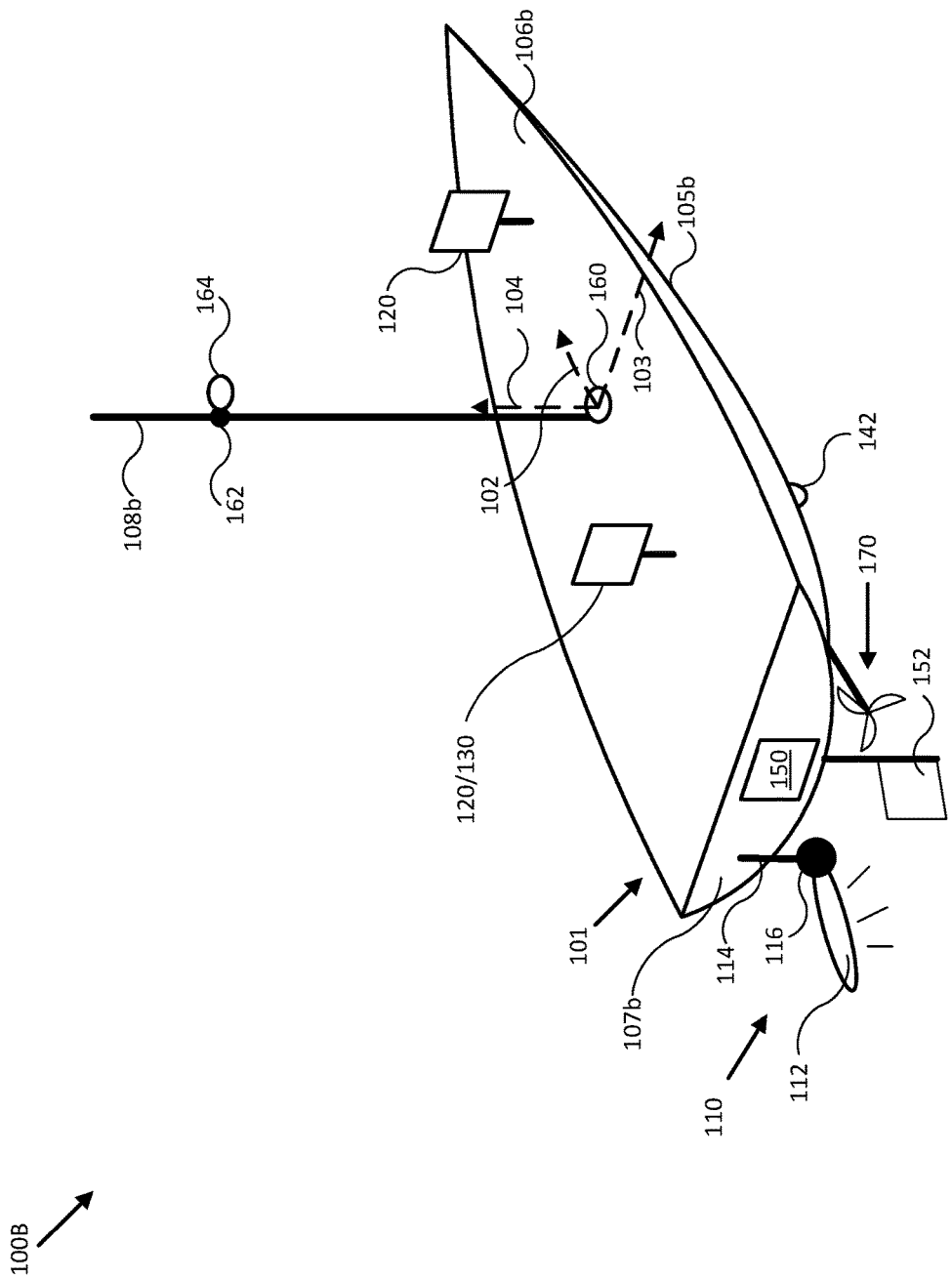
FIG. 1B illustrates a diagram of a watercraft including a portion of a route distribution system in accordance with an embodiment of the disclosure.

FIG. 1B illustrates a diagram of system 100B in accordance with an embodiment of the disclosure. In the embodiment shown in FIG. 1B, system 100B may be implemented to provide coordinated route distribution and/or other operational control of mobile structure 101, similar to system 100 of FIG. 1B. For example, system 100B may include integrated user interface/controller 120/130, secondary user interface 120, steering sensor/actuator 150, sensor cluster 160 (e.g., route retriever 190, orientation sensor 140, gyroscope/accelerometer 144, and/or GPS 146), and various other sensors and/or actuators. In the embodiment illustrated by FIG. 1B, mobile structure 101 is implemented as a motorized boat including a hull 105b, a deck 106b, a transom 107b, a mast/sensor mount 108b, a rudder 152, an inboard motor 170, an actuated sonar system 110 coupled to transom 107b, and an actuated device 164 (e.g., a camera, spotlight, or other actuated device or sensor) coupled to mast/sensor mount 108b though roll, pitch, and/or yaw actuator 162. In other embodiments, hull 105b, deck 106b, mast/sensor mount 108b, rudder 152, inboard motor 170, and various actuated devices may correspond to attributes of a passenger aircraft or other type of vehicle, robot, or drone, for example, such as an undercarriage, a passenger compartment, an engine/engine compartment, a trunk, a roof, a steering mechanism, a headlight, a radar system, and/or other portions of a vehicle.

As depicted in FIG. 1B, mobile structure 101 includes actuated sonar system 110, which in turn includes transducer assembly 112 coupled to transom 107b of mobile structure 101 through assembly bracket/actuator 116 and transom bracket/electrical conduit 114. In some embodiments, assembly bracket/actuator 116 may be implemented as a roll, pitch, and/or yaw actuator, for example, and may be adapted to adjust an orientation of transducer assembly 112 according to control signals and/or an orientation (e.g., roll, pitch, and/or yaw) or position of mobile structure 101 provided by user interface/controller 120/130. Similarly, actuator 162 may be adapted to adjust an orientation of actuated device 164 according to control signals and/or an orientation or position of mobile structure 101 provided by user interface/controller 120/130. For example, user interface/controller 120/130 may be adapted to receive an orientation of transducer assembly 112 and/or actuated device 164 (e.g., from sensors embedded within the assembly or device), and to adjust an orientation of either to maintain sensing/illuminating a position and/or absolute direction in response to motion of mobile structure 101, using one or more orientations and/or positions of mobile structure 101 and/or other sensor information derived by executing various methods described herein.

In one embodiment, user interfaces 120 may be mounted to mobile structure 101 substantially on deck 106b and/or mast/sensor mount 108b. Such mounts may be fixed, for example, or may include gimbals and other leveling mechanisms/actuators so that a display of user interfaces 120 stays substantially level with respect to a horizon and/or a "down" vector (e.g., to mimic typical user head motion/orientation). In another embodiment, at least one of user interfaces 120 may be located in proximity to mobile structure 101 and be mobile throughout a user level (e.g., deck 106b) of mobile structure 101. For example, secondary user interface 120 may be implemented with a lanyard and/or other type of strap and/or attachment device and be physically coupled to a user of mobile structure 101 so as to be in proximity to mobile structure 101. In various embodiments, user interfaces 120 may be implemented with a relatively thin display that is integrated into a PCB of the corresponding user interface in order to reduce size, weight, housing complexity, and/or manufacturing costs.

As shown in FIG. 1B, in some embodiments, speed sensor 142 may be mounted to a portion of mobile structure 101, such as to hull 105b, and be adapted to measure a relative water speed. In some embodiments, speed sensor 142 may be adapted to provide a thin profile to reduce and/or avoid water drag. In various embodiments, speed sensor 142 may be mounted to a portion of mobile structure 101 that is substantially outside easy operational accessibility. Speed sensor 142 may include one or more batteries and/or other electrical power storage devices, for example, and may include one or more water-powered turbines to generate electrical power. In other embodiments, speed sensor 142 may be powered by a power source for mobile structure 101, for example, using one or more power leads penetrating hull 105b. In alternative embodiments, speed sensor 142 may be implemented as a wind velocity sensor, for example, and may be mounted to mast/sensor mount 108b to have relatively clear access to local wind.

In the embodiment illustrated by FIG. 1B, mobile structure 101 includes direction/longitudinal axis 102, direction/lateral axis 103, and direction/vertical axis 104 meeting approximately at mast/sensor mount 108b (e.g., near a center of gravity of mobile structure 101). In one embodiment, the various axes may define a coordinate frame of mobile structure 101 and/or sensor cluster 160. Each sensor adapted to measure a direction (e.g., velocities, accelerations, headings, or other states including a directional component) may be implemented with a mount, actuators, and/or servos that can be used to align a coordinate frame of the sensor with a coordinate frame of any element of system 100B and/or mobile structure 101. Each element of system 100B may be located at positions different from those depicted in FIG. 1B. Each device of system 100B may include one or more batteries or other electrical power storage devices, for example, and may include one or more solar cell modules or other electrical power generating devices. In some embodiments, one or more of the devices may be powered by a power source for mobile structure 101. As noted herein, each element of system 100B may be implemented with an antenna, a logic device, and/or other analog and/or digital components enabling that element to provide, receive, and process sensor signals and interface or communicate with one or more devices of system 100B. Further, a logic device of that element may be adapted to perform any of the methods described herein.

Figure 2:
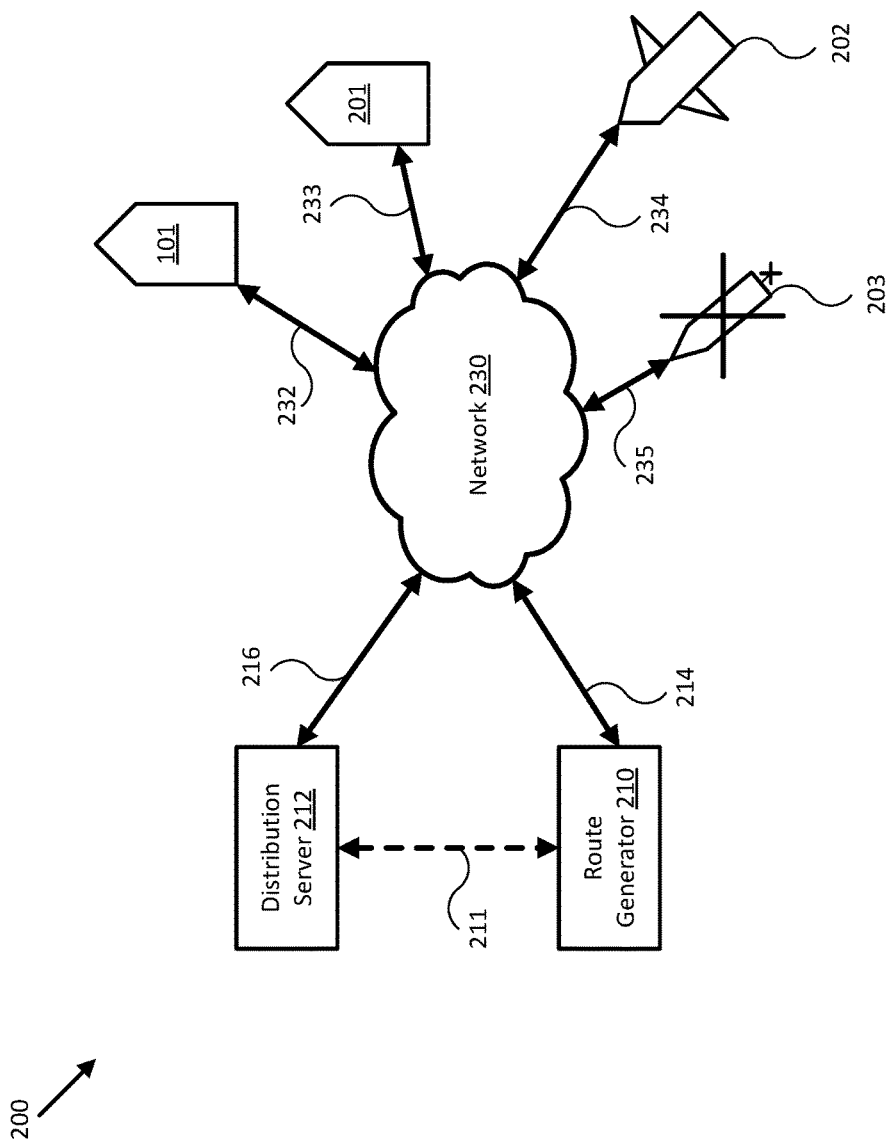
FIG. 2 illustrates a block diagram of a route distribution system in accordance with an embodiment of the disclosure.

FIG. 2 illustrates a block diagram of a route distribution system 200 in accordance with an embodiment of the disclosure. As can be seen in FIG. 2, system 200 may include a route generator 210 configured to communicate with a route distribution server 212 over a combination of communication links 214 and 216 and network 230 and/or optional direct communication link 211. Various mobile structures 101, 201, 202, 203, each including a route retriever (e.g., route retriever 190 in FIG. 1A), configured to access distribution server 212 over some combination of communication link 216, network 230, and/or respective communication links 232-235. Each of mobile structures 101 and 201 (e.g., watercraft), 202 (e.g., an unmanned airplane/drone), and 203 (e.g., a helicopter) may be implemented as described with respect to mobile structure 101 of FIG. 1. In various embodiments, communication links 211, 214, 216, and 232-235, and network 230, may include one or more wired and/or wireless network interfaces, protocols, topologies, and/or methodologies, as described herein.

In typical operation, route generator 210 may be configured to generate one or more coordinated routes for mobile structures 101, 201, 202, 203, and to provide the coordinated routes to distribution server 212. Each of mobile structures 101, 201, 202, 203, may then access distribution server 212, asynchronously, and retrieve their respective routes and/or the routes of the other mobile structures. In addition, each of mobile structures 101, 201, 202, 203, may be configured to provide corresponding operational data to distribution server 212, such as indicating successful retrieval of a corresponding route, providing position data for a corresponding mobile structure, and/or providing other sensor data, such as environmental data corresponding to the mobile structure and/or a mayday alert. In various embodiments, the routes and/or the operational data may be time stamped to differentiate old and updated routes and/or operational data.

Route generator 210 may be implemented as a logic device, a tablet computer, laptop, desktop, and/or server computer that may be configured to access various sources of environmental data and/or forecast models associated with a geographical area in which coordinated routing of mobile structures is desired. For example, such geographical area may correspond to a sea port (e.g., with multiple watercraft coordinating movement to and from docks), a search and rescue area (e.g., with multiple types of mobile structures coordinating efforts to search above, below, and/or at the surface of the geographical area, and/or other geographical areas where movement of multiple mobile structures requires coordination for safety and/or efficiency.

In one embodiment, the geographical area may correspond to a shipping lane, for example, and route generator 210 may be configured to generate routes for a variety of large and small watercraft that maximize efficiency of transit (e.g., minimize fuel consumption) and/or transit safety for the group based on each watercraft's characteristics and/or desired route along with various environmental conditions, such as currents, tides, wind direction and speed, ice and other hazards, and/or other environmental conditions. In another embodiment, the geographical area may correspond to a fishing area, for example, and route generator 210 may be configured to generate routes maximizing catch productivity and/or minimizing fuel consumption based on various environmental conditions. In yet another embodiment, the geographical area may correspond to a search and rescue area, for example, and route generator 210 may be configured to generate routes for search and rescue teams that maximize probability of finding corresponding surface objects within a particular time period based on various environmental conditions. In still further embodiments, the geographical area may correspond to an oil spill or other pollutant, for example, and route generator 210 may be configured to generate routes for placement of corresponding containment devices that account for drift and/or spread of the pollutant based on tides, winds, and/or other environmental conditions.

Sources of environmental data and/or forecast models associated with a geographical area may include, for example, various satellite, radar, barometric, and/or other weather related data provided by a weather information source, various weather and/or ocean forecast models available over the Internet and/or other networks (e.g., BLUElink, HYCOM NCEP, HYCOM Navy), one or more remote sensing/reporting modules (e.g., a self-locating datum marker buoy or SLDMB), and the various mobile structures themselves (e.g., if the mobile structure are configured to provide operational data back to distribution server 212 and/or route generator 210).

Each route may be generated in one of a variety of data formats, for example, such as the GPS exchange format (GPX) and/or other data formats that can be used to describe a route for a mobile structure. Such route data may include times and/or ranges of times to reach geographical positions and/or waypoints, for example, in addition to other route data. For example, in one embodiment, the route data may include a series of geographical positions or waypoints and control parameters for one or more devices mounted to mobile structure 101, such as an actuated sonar system or infrared camera. In such embodiment, the route data may instruct mobile structure 101 to navigate to various waypoints along specified headings at specific times and/or ranges of times, for example, and to acquire sonar and/or infrared imagery taken along a particular relative trajectory relative to mobile structure 101 while traversing the route. Once one or more routes are generated, route generator 210 may be configured to provide them to distribution server 212.

Distribution server 212 may be implemented as a logic device, a tablet computer, laptop, desktop, and/or server computer that may be configured receive routes generated by route generator 210 and provide them to mobile structures 101, 201, 202, 203. In one embodiment, distribution server 212 may be implemented as an email server, a twitter server, an FTP server, a test message server, and/or other data and/or ASCII file server configured to allow and/or mediate distribution of routes generated by route generator 210 to mobile structures 101, 201, 202, 203. In addition, distribution server 212 may be configured to monitor access to such routes and/or indicate successful retrieval of individual routes to route generator 210 (e.g., which can adjust and/or update the routes based on which routes are successfully retrieved and/or when they are successfully retrieved, relative to various environmental conditions). In some embodiments, distribution server 212 may be configured to provide routes for multiple mobile structures to a single mobile structure in order to provide an overview of the coordinated routing. Such embodiments allow a user and/or autopilot to evaluate a level of risk associated with navigating according to the provided route and/or deviating from the provided route, such as in the event of an unmonitored obstruction or hazard.

In embodiments where mobile structures 101, 201, 202, and/or 203 are configured to provide operational data back to distribution server 212 and/or route generator 210, distribution server 212 may be configured to receive the operational data and/or provide it to route generator 210 and/or to other ones of mobile structures 101, 201, 202, and/or 203. Although distribution server 212 is shown separate from route generator 210 in FIG. 2, in some embodiments route generator 210 and distribution server 212 may be integrated into one logic device, tablet computer, laptop, desktop, and/or server computer. Also, although network 230 is shown as one element in FIG. 2, in various embodiments, network 210 may include multiple network infrastructures and/or combinations of infrastructures where, for example, each mobile structure 101, 201, 202, and/or 203 may be configured to use substantially different network infrastructures to access distribution server 212.

Figure 3:
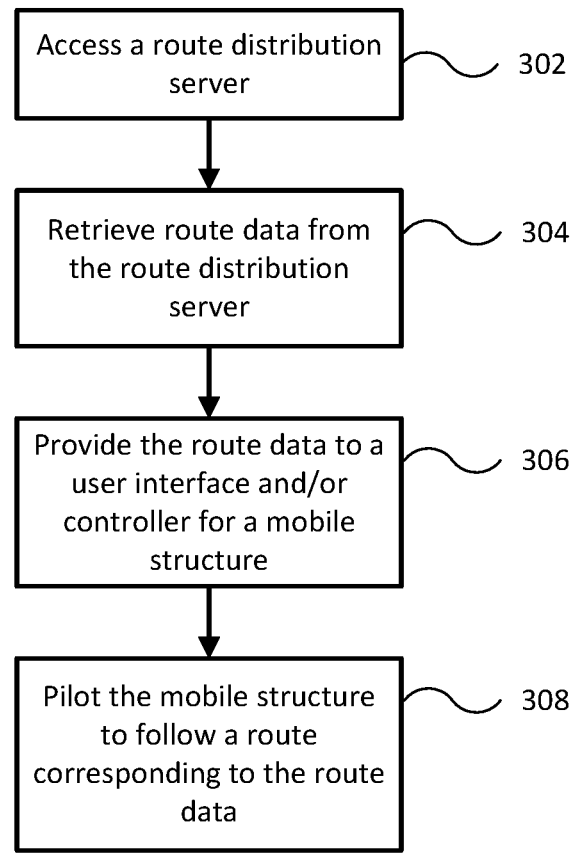
FIG. 3 illustrates a flow diagram of various operations to operate a route distribution system in accordance with an embodiment of the disclosure.

FIG. 3 illustrates a flow diagram of process 300 to operate route distribution system 100 for mobile structure 101 in accordance with an embodiment of the disclosure. In some embodiments, the operations of FIG. 3 may be implemented as software instructions executed by one or more logic devices associated with corresponding electronic devices, sensors, and/or structures depicted in FIGS. 1A through 2. More generally, the operations of FIG. 3 may be implemented with any combination of software instructions and/or electronic hardware (e.g., inductors, capacitors, amplifiers, actuators, or other analog and/or digital components).

It should be appreciated that any step, sub-step, sub-process, or block of process 300 may be performed in an order or arrangement different from the embodiments illustrated by FIG. 3. For example, in other embodiments, one or more blocks may be omitted from the various processes, and blocks from one process may be included in another process. Furthermore, block inputs, block outputs, various sensor signals, sensor information, calibration parameters, and/or other operational parameters may be stored to one or more memories prior to moving to a following portion of a corresponding process. Although process 300 is described with reference to systems 100, 100B, and/or 200 and FIGS. 1A-2, process 300 may be performed by other systems different from those systems and including a different selection of electronic devices, sensors, assemblies, mobile structures, and/or mobile structure attributes.

Process 300 represents a method for providing coordinated route distribution using systems 100, 100B, and/or 200 in accordance with embodiments of the disclosure. At the initiation of process 300, various system parameters may be populated by prior execution of a process similar to process 300, for example, or may be initialized to zero and/or one or more values corresponding to typical, stored, and/or learned values derived from past operation of process 300, as described herein.

In block 302, a logic device accesses a route distribution server. For example, controller 130 and/or route retriever 190 of system 100 may be configured to use one or more network interfaces to access route distribution server 212 of FIG. 2. In some embodiments, distribution server 212 may be configured to monitor access and indicate access by a particular route retriever 190 and/or mobile structure 101 to route generator 210. In various embodiments, controller 130 and/or route retriever 190 may be configured to authenticate and/or identify mobile structure 101 (e.g., email login, username/password, and/or other authentication or identification methodology) to distribution server 212 before being able to access data stored within distribution server 212. After such authentication and/or identification, for example, controller 130 and/or route retriever 190 may be configured to provide operational data, corresponding to mobile structure 101, to distribution server 212, which may then be provided to route generator 210 to help coordinate and/or update routes distributed among a group of mobile structures.

In block 304, a logic device retrieves route data from a route distribution server. For example, controller 130 and/or route retriever 190 of system 100 may be configured to retrieves route data from route distribution server 212. In some embodiments, the route data may include routes for other mobile structures, for example, to provide an overview of the coordinated routing. In other embodiments, controller 130 and/or route retriever 190 may be configured to determine if the route data is a complete route (e.g., through a checksum, error checking, validation, or other process) and/or indicate successful retrieval of a route and/or at a particular time. Such indication may be one or more email messages, text messages, data files, data streams, and/or other data provided to distribution server 212.

In block 306, a logic device provides route data to a user interface and/or a controller for a mobile structure. For example, controller 130 and/or route retriever 190 of system 100 may be configured to provide route data to user interface 120 and/or controller 130 for mobile structure 101. In some embodiments, controller 130 and/or route retriever 190 may be configured to translate (e.g., extract and/or convert formats and/or data types) the route data into a series of waypoints that can be displayed (e.g., on a chart) by user interface 120 and/or used by controller 130 to autopilot mobile structure 101 according to the waypoints. For example, such process can include converting the route data into a form that is readable by the particular user interface being used.

In embodiments where the route data includes routes for other mobile structures, controller 130 and/or route retriever 190 may be configured to provide waypoints for other routes to user interface 120 for display to a user, for example, and/or to controller 130 for evaluation of a risk level for a current route with respect to the other routes. In other embodiments, controller 130 and/or route retriever 190 may be configured to translate the route data into control parameters for one or more devices integrated with mobile structure 101 and/or system 100. Such control parameters may include a relative or absolute orientation, a sweep rate, a sensor beam width, an acquisition rate, a spectral content, and/or other control parameters for an actuated or non-actuated device mounted to mobile structure 101.

In block 308, a logic device pilots a mobile structure to follow a route corresponding to route data. For example, controller 130 of system 100 may be configured to pilot mobile structure 101 to follow a route corresponding to the route data received in blocks 304 and/or 306. In embodiments where the route data includes times and/or ranges of times associated with reaching the waypoints, controller 130 may be configured to autopilot mobile structure 101 to reach each waypoint at the designated time or within the designated range of time using steering sensor/actuator 150 and/or propulsion system 170. In embodiments where the route data includes control parameters associated with the waypoints, controller 130 may be configured to control corresponding devices (e.g., actuated sensors, spotlights, other environmental sensors) in accordance with the control parameters as mobile structure 101 reaches each waypoint.

It is contemplated that any one or combination of methods to provide coordinated route distribution may be performed according to one or more operating contexts of a control loop, for example, such as a startup, learning, running, and/or other type operating context. For example, any portion of process 300 may proceed back to an initial block and proceed through the corresponding process again to retrieve updated route data, as in a control loop. In one embodiment, controller 130 and/or route retriever 190 may be configured to access route distribution server 212 over network 230 and determine (e.g., based on time stamps of the current route data and updated route data, and/or an update indicator flag set by route generator 210 and/or route distribution server 212 based on prior indications of successfully retrieved route data, for example) that there is updated route data available on route distribution server 212. Upon such determination, controller 130 and/or route retriever 190 may be configured to retrieve the update route data and proceed through process 300 as shown.

Embodiments of the present disclosure can thus provide reliable and accurate route distribution and corresponding directional control for mobile structures. Such embodiments may be used to assist in navigation of a mobile structure and/or in the operation of other systems, devices, and/or sensors coupled to or associated with the mobile structure, particularly in a coordinated manner with one or more additional mobile structures and/or types of mobile structures. For example, embodiments of the present disclosure may be used to provide directional control for actuators used to aim an actuated device (e.g., a visible and/or infrared spectrum camera, a spotlight, other directional illumination and/or sensor systems) according to a desired direction.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
a logic device configured to communicate with a user interface coupled to a mobile structure and optionally a controller for the mobile structure, wherein the logic device is adapted to:
retrieve route data for the mobile structure from a route distribution server over a network;
determine the route data for the mobile structure comprises a complete route;
indicate successful retrieval of the route data to the route distribution server; and
provide the route data to the user interface and optionally the controller for the mobile structure, wherein the providing the route data comprises:
translating the route data into a target heading and a first series of waypoints, corresponding to a first successfully retrieved route, that are displayed by the user interface and/or used by the controller to autopilot the mobile structure; and
translating the route data into a second series of waypoints corresponding to a second successfully retrieved route for at least one other mobile structure that is displayed by the user interface.

2. The system of claim 1, wherein the logic device is adapted to:
access the route distribution server by identifying the mobile structure to the route distribution server prior to retrieving the route data.

3. The system of claim 1, wherein the logic device is adapted to:
access the route distribution server by authenticating the mobile structure to the route distribution server, through use of an email login and/or a username/password authentication methodology prior to retrieving the route data.

4. The system of claim 1, wherein the logic device is adapted to:
indicate successful retrieval of the route data by providing one or more email messages, text messages, data files, and/or data streams to the route distribution server.

5. The system of claim 1, wherein:
the route data comprises a first unique identifier for the mobile structure and/or a second unique identifier for the other mobile structure that are displayed by the user interface; and
the first series of waypoints are displayed by the user interface and used by the controller to autopilot the mobile structure.

6. The system of claim 1, wherein the route data includes routes for a plurality of other mobile structures, and wherein the logic device is configured to:
translate the route data into a plurality of series of waypoints corresponding to the routes for the plurality of other mobile structures that are displayed by the user interface coupled to the mobile structure.

7. The system of claim 1, wherein:
the route data includes times and/or ranges of times associated with reaching each waypoint in the first series of waypoints; and
the system further comprises the controller configured to autopilot the mobile structure to reach each waypoint at the times or within the ranges of times using a steering sensor/actuator and/or a propulsion system for the mobile structure.

8. The system of claim 1, wherein for the provide the route data to the user interface and/or the controller, the logic device is adapted to:
translate the route data into the first series of waypoints and corresponding control parameters for an actuated device mounted to the mobile structure, wherein the controller is configured to control the actuated device in accordance with the control parameters as the mobile structure reaches the corresponding waypoints.

9. The system of claim 8, wherein:
the mobile structure comprises a watercraft;
the actuated device comprises an actuated sonar system, an actuated spotlight, an actuated visible spectrum camera, and/or an actuated infrared camera; and
the control parameters comprise a relative or absolute orientation, a sweep rate, a sensor beam width, an acquisition rate, and/or a spectral content for the actuated device defined at each waypoint in the first series of waypoints.

10. The system of claim 1, wherein the logic device is configured to:
- access the route distribution server after the providing the route data to the user interface and/or the controller;
- determine there is updated route data for the mobile structure on the route distribution server; and
- retrieve the updated route data from the route distribution server.

11. A method comprising:
- retrieving route data for a mobile structure from a route distribution server over a network;
- determining the route data for the mobile structure comprises a complete route;
- indicating successful retrieval of the route data to the route distribution server; and
- providing the route data to a user interface and/or a controller for the mobile structure, wherein the providing the route data comprises:
  - translating the route data into a target heading and a first series of waypoints, corresponding to a first successfully retrieved route, that are displayed by the user interface and/or used by the controller to autopilot the mobile structure; and
  - translating the route data into a second series of waypoints corresponding to a second successfully retrieved route for at least one other mobile structure that is displayed by the user interface.

12. The method of claim 11, further comprising:
accessing the route distribution server by identifying the mobile structure to the route distribution server prior to retrieving the route data.

13. The method of claim 11, further comprising:
accessing the route distribution server by authenticating the mobile structure to the route distribution server, through use of an email login and/or a username/password authentication methodology prior to retrieving the route data.

14. The method of claim 11, further comprising:
indicating successful retrieval of the route data by providing one or more email messages, text messages, data files, and/or data streams to the route distribution server.

15. The method of claim 11, wherein:
the route data comprises a first unique identifier for the mobile structure and a second unique identifier for the other mobile structure that are displayed by the user interface; and
the first series of waypoints are displayed by the user interface and used by the controller to autopilot the mobile structure.

16. The method of claim 11, wherein the route data includes routes for a plurality of other mobile structures, the method further comprising:
translating the route data into a plurality of series of waypoints corresponding to the routes for the plurality of other mobile structures that are displayed by the user interface coupled to the mobile structure.

17. The method of claim 11, wherein:
the route data includes times and/or ranges of times associated with reaching each waypoint in the first series of waypoints; and
the controller is configured to autopilot the mobile structure to reach each waypoint at the times or within the ranges of times using a steering sensor/actuator and/or a propulsion system for the mobile structure.

18. The method of claim 11, wherein the providing the route data to the user interface and/or the controller comprises:
translating the route data into the first series of waypoints and corresponding control parameters for an actuated device mounted to the mobile structure, wherein the controller is configured to control the actuated device in accordance with the control parameters as the mobile structure reaches the corresponding waypoints.

19. The method of claim 18, wherein:
the actuated device comprises an actuated sonar system, an actuated spotlight, an actuated visible spectrum camera, and/or an actuated infrared camera; and
the control parameters comprise a relative or absolute orientation, a sweep rate, a sensor beam width, an acquisition rate, and/or a spectral content for the actuated device defined at each waypoint in the first series of waypoints.

20. The method of claim 11, further comprising:
accessing the route distribution server after the providing the route data to the user interface and/or the controller;
determining there is updated route data for the mobile structure on the route distribution server; and
retrieving the updated route data from the route distribution server.

* * * * *